United States Patent
Muraoka

(10) Patent No.: US 11,929,473 B2
(45) Date of Patent: Mar. 12, 2024

(54) METHOD OF RECOVERING COBALT AND NICKEL

(71) Applicant: MITSUBISHI MATERIALS CORPORATION, Tokyo (JP)

(72) Inventor: Hiroki Muraoka, Iwaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 18/032,277

(22) PCT Filed: Aug. 11, 2021

(86) PCT No.: PCT/JP2021/029673
§ 371 (c)(1),
(2) Date: Apr. 17, 2023

(87) PCT Pub. No.: WO2023/017590
PCT Pub. Date: Feb. 16, 2023

(65) Prior Publication Data
US 2023/0307735 A1  Sep. 28, 2023

(51) Int. Cl.
*C01G 51/04* (2006.01)
*C01G 53/04* (2006.01)
(Continued)

(52) U.S. Cl.
CPC ............ *H01M 10/54* (2013.01); *C01G 51/04* (2013.01); *C01G 53/04* (2013.01); *C22B 3/08* (2013.01);
(Continued)

(58) Field of Classification Search
CPC ....... H01M 10/54; C01G 51/04; C01G 53/04; C22B 3/08; C22B 3/12; C22B 3/22; C22B 21/0023; C22B 23/043; C22B 23/0446
(Continued)

(56) References Cited

U.S. PATENT DOCUMENTS

2018/0105896 A1  4/2018  Yoneyama et al.
2022/0166079 A1  5/2022  Liu et al.

FOREIGN PATENT DOCUMENTS

CN  107429317 A      12/2017
CN  107910612 A   *   4/2018
(Continued)

OTHER PUBLICATIONS

Tatsuo Yonekubo, "Relation between pH and Metallic Coprecipitation with Aluminium Hydroxide," Memoirs of the Faculty of Engineering, Fukui University, 1963, vol. 11, No. 1 and 2, pp. 149-154 and English abstract thereof. (cited in the ISR; An English translation of the ISR serves as a concise explanation of relevance.).
International Search Report dated Sep. 7, 2021, issued for PCT/JP2021/029673 and English translation thereof.
(Continued)

Primary Examiner — Melissa S Swain
(74) Attorney, Agent, or Firm — Locke Lord LLP

(57) ABSTRACT

A method of recovering cobalt and nickel includes the steps of: adding alkaline to an acidic solution containing aluminum together with cobalt and nickel, adjusting pH of the acidic solution to 5 to 7, and converting the cobalt, the nickel and the aluminum into hydroxides thereof; recovering the hydroxides by solid-liquid separation, mixing the recovered hydroxides with an alkaline solution, and leaching aluminum contained in the hydroxides under a liquid condition of pH 8 or more; and recovering a cobalt hydroxide and a nickel hydroxide that aluminum is separated therefrom by solid-separation on a leachate.

8 Claims, 1 Drawing Sheet

(51) Int. Cl.
*C22B 3/00* (2006.01)
*C22B 3/08* (2006.01)
*C22B 3/12* (2006.01)
*C22B 3/22* (2006.01)
*C22B 21/00* (2006.01)
*H01M 10/54* (2006.01)

(52) U.S. Cl.
CPC .................. *C22B 3/12* (2013.01); *C22B 3/22* (2013.01); *C22B 21/0023* (2013.01); *C22B 23/043* (2013.01); *C22B 23/0446* (2013.01)

(58) Field of Classification Search
USPC .......................................................... 123/140
See application file for complete search history.

(56) References Cited

FOREIGN PATENT DOCUMENTS

| CN | 109346741 | A | * | 2/2019 | ............ H01M 10/54 |
| CN | 111270073 | A | | 6/2020 | |
| EP | 3431618 | A1 | | 1/2019 | |
| JP | 2002-143883 | A | | 5/2002 | |
| JP | 2015-183292 | A | | 10/2015 | |
| JP | 2016-113672 | A | | 6/2016 | |
| JP | 2016-186118 | A | | 10/2016 | |
| JP | 2017-036478 | A | | 2/2017 | |
| JP | 2018-040035 | A | | 3/2018 | |
| JP | 6314814 | B2 | | 4/2018 | |
| KR | 10-2018-0080992 | A | | 7/2018 | |
| KR | 10-2154599 | B1 | | 9/2020 | |
| WO | 2017/091562 | A1 | | 6/2017 | |
| WO | 2021/047352 | A1 | | 3/2021 | |

OTHER PUBLICATIONS

Office Action dated Aug. 18, 2023, issued for KR10-2022-7018277 and English translation thereof.
Office Action dated Sep. 27, 2023, issued for CN202180069923.0 and English translation of the Search Report.
Supplementary European Search Report dated Dec. 11, 2023, issued for EP21953485.6.

* cited by examiner

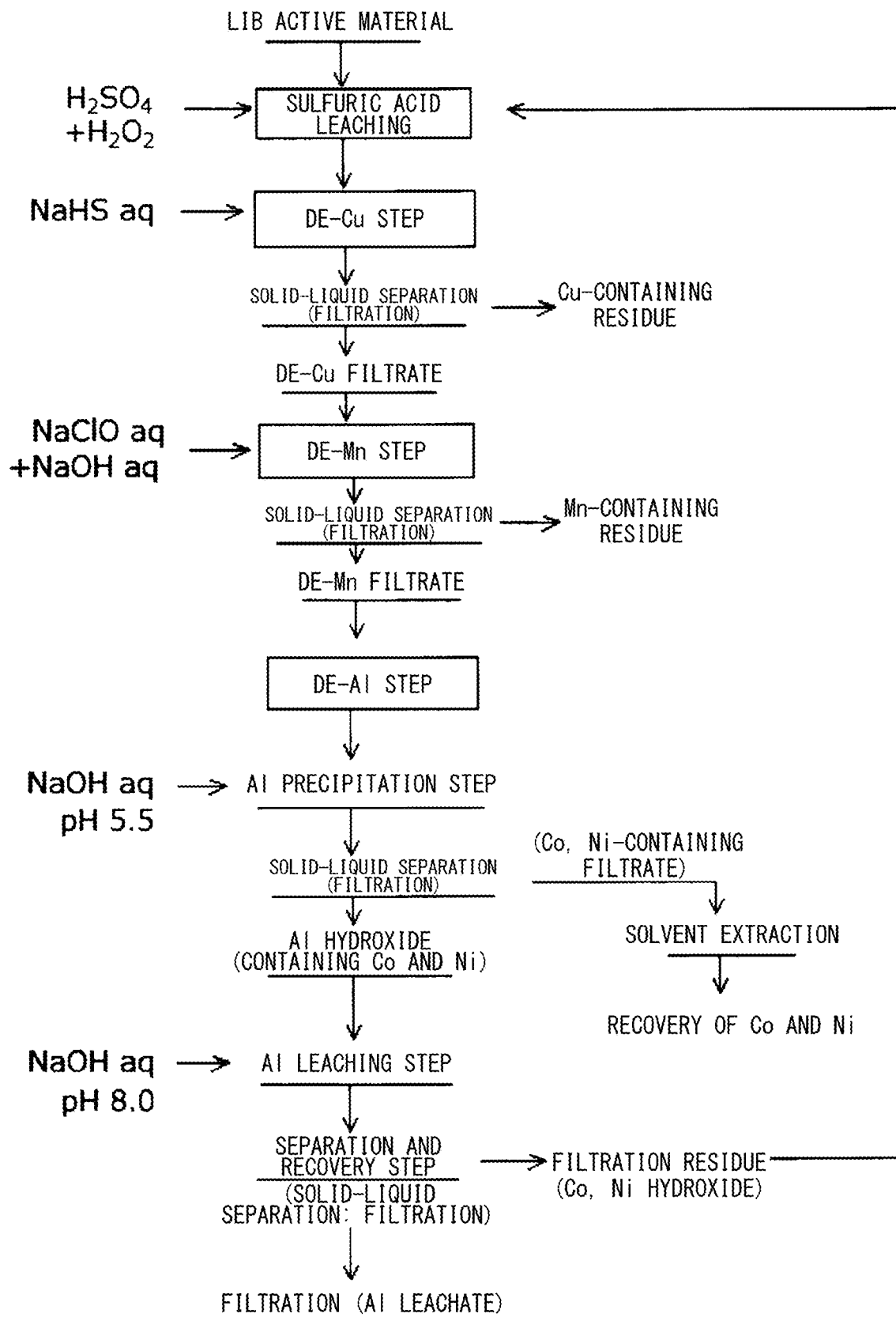

METHOD OF RECOVERING COBALT AND NICKEL

TECHNICAL FIELD

The present invention relates to a method of cobalt and nickel by separating aluminum efficiently from a solution containing aluminum together with cobalt and nickel. More specifically, the present invention relates to a method of recovering valuable cobalt and nickel by separating them from aluminum efficiently from waste (referred to as waste LIB) of a lithium ion battery.

BACKGROUND ART

The methods of Patent Document 1 and Patent Document 2 are known as means for recovering valuable metals such as cobalt and nickel from waste LIB. (A) In the method disclosed in Patent Document 1, the pulverized waste LIB product is acid-dissolved to leach valuable metals such as cobalt and nickel, the leachate is neutralized to precipitate aluminum, and solid-liquid separation is performed to remove aluminum. Then, the cobalt and nickel are extracted into an organic solvent from the leachate, separated from phosphorus and fluorine in the residual liquid, and the cobalt and nickel are back-extracted and recovered from the organic solvent. (B) In the method disclosed in Patent Document 2, a hydrogen peroxide solution is added to an acid in which the pulverized waste LIB product is immersed to leach the cobalt, nickel, and the like, while manganese is separated as a residue and aluminum is extracted and separated from the leachate by an organic solvent after being recovered. Then, the cobalt, nickel and the like are recovered from the liquid after extraction.

CITATION LIST

Patent Documents

[Patent Document 1]
Japanese Unexamined Patent Application, First Publication No. 2016-113672
[Patent Document 2]
Japanese Unexamined Patent Application, First Publication No. 2016-186118

SUMMARY OF INVENTION

Technical Problem

As described in Patent Document 1, in the method of separating aluminum into a hydroxide precipitate by adjusting the pH, the cobalt and nickel also form hydroxides at the same time, resulting in process loss. Further, when the hydroxides are acid-dissolved and returned to the leachate before the formation of the hydroxides to recover the above process loss, a part of the aluminum hydroxide is also dissolved at the same time, so that this returns to the leachate. In this case, there is a problem that the load of removing aluminum increases in the next step because the separation of aluminum becomes insufficient. On the other hand, in the extraction and separation of aluminum using the organic solvent, there are problems that the processing cost becomes high and the operation becomes complicated because an organic solvent such as PC-88A is used.

Solution to Problem

The present invention solves the problems in the above-described conventionally known recovery methods and improves the method of separating aluminum into hydroxide precipitates. In the method related to present invention, aluminum is selectively and efficiently separated from precipitated hydroxides including aluminum together with cobalt and nickel. Accordingly, the recovery ratio of cobalt and nickel can be increased in the provided method.

The present invention is a method of recovering cobalt and nickel that solves the above-described problems by the following configurations.

[1] A method of recovering cobalt and nickel, the method including the steps of: adding alkaline to an acidic solution containing aluminum together with cobalt and nickel, adjusting pH of the acidic solution to 5 to 7, and converting the cobalt, the nickel and the aluminum into hydroxides thereof; recovering the hydroxides by solid-liquid separation, mixing the recovered hydroxides with an alkaline solution, and leaching aluminum contained in the hydroxides under a liquid condition of pH 8 or more; and recovering a cobalt hydroxide and a nickel hydroxide that aluminum is separated therefrom by solid-separation on a leachate.

[2] The method of recovering cobalt and nickel according to the above-described [1], wherein the acidic solution containing aluminum together with cobalt and nickel is a sulfate solution having a concentration of 1.5 mol/L to 2 mol/L, the alkaline is sodium hydroxide having a concentration of less than 1 mol/L, pH of the acidic solution being adjusted to pH 5 to 7 by adding the sodium hydroxide to the sulfate solution to produce the hydroxides, the alkaline solution is a sodium hydroxide solution having a concentration of 4 mol/L to 6 mol/L, the aluminum contained in the hydroxides being leached out by mixing the sodium hydroxide solution to the recovered hydroxides recovered by solid-liquid separation under the liquid condition of pH 8 or more and a liquid temperature of 50° C. to 80° C., and the cobalt hydroxide and the nickel hydroxide are recovered by the solid-liquid separation on the leachate.

[3] The method of recovering cobalt and nickel according to the above-described [1] or [2], wherein concentrations of the cobalt and nickel in the acidic solution is increased by returning the cobalt hydroxide and the nickel hydroxide recovered after removing aluminum to the acidic solution at a beginning of a process.

[4] The method of recovering cobalt and nickel according to any one of the above-described [1] to [3], wherein the acidic solution containing aluminum together with cobalt and nickel is a sulfuric acid leached solution of crushed active material of a positive electrode taken out from a lithium-ion battery waste.

Advantageous Effects of Invention

According to the method of the present invention, aluminum can be efficiently and selectively separated from the acidic solution containing aluminum together with cobalt and nickel, so that the loss of the cobalt and nickel can be avoided and the recovery ratio of the cobalt and nickel can be increased.

BRIEF DESCRIPTION OF DRAWINGS

FIG. 1 is a processing step chart of the second embodiment.

DESCRIPTION OF EMBODIMENTS

Next, embodiments of the present invention will be described with reference to the drawings.

[Specific Explanation]

The method of the first embodiment of the present invention, a method of recovering cobalt and nickel, the method including the steps of: adding alkaline to an acidic solution containing aluminum together with cobalt and nickel, adjusting pH of the acidic solution to 5 to 7, and converting the cobalt, the nickel and the aluminum into hydroxides thereof; recovering the hydroxides by solid-liquid separation, mixing the recovered hydroxides with an alkaline solution, and leaching aluminum contained in the hydroxides under a liquid condition of pH 8 or more; and recovering a cobalt hydroxide and a nickel hydroxide that aluminum is separated therefrom by solid-separation on a leachate.

The acidic solution containing aluminum together with cobalt and nickel used in the recovery method of the present invention is, for example, a solution obtained by leaching the positive electrode active material taken out from the lithium ion battery waste with sulfuric acid. The positive electrode active material of a lithium ion battery contains nickel, cobalt, manganese, and the like together with lithium, and a laminating material such as an aluminum foil is provided inside the battery. Aluminum as a laminating material is attached to the crushed positive electrode active material taken out by crushing the lithium ion battery waste, and copper as an energizing material is mixed in thereof. The leachate obtained by leaching the crushed positive electrode active material with sulfuric acid or the like contains nickel, cobalt, lithium, as well as aluminum and copper. Lithium is recovered from this leachate, and nickel and cobalt are further recovered.

The recovery method of the present invention can be used as a method of recovering nickel and cobalt from the pulverized positive electrode active material taken out from the lithium ion battery waste. Specifically, for example, a pulverized positive electrode active material of lithium ion battery waste is leached out using sulfuric acid added with hydrogen peroxide. Then, sodium hydrosulfide (NaHS aq) is added to this leachate to make copper in the liquid a copper sulfide precipitate, the copper sulfide precipitate is filtered to remove copper, and sodium hydroxide (NaOH) is added to this filtrate to adjust the pH to 2-4. Sodium hypochlorite (NaClO aq) is added to make manganese in the solution into manganese oxide precipitate, and solid-liquid separation is performed to remove the manganese oxide precipitate. In the recovery method of the present invention, the leachate from which copper and manganese have been removed can be used. Further, as the recovery method of the present invention, a leachate obtained by leaching a pulverized positive electrode active material with sulfuric acid can be used.

The acidic solution containing aluminum together with cobalt and nickel used in the recovery method of the present invention is, for example, an acidic solution obtained by leaching a positive material active material with sulfuric acid having a concentration of 1.5 to 2 mol/L (sulfuric acid leachate (sulfuric acid solution)). The recovery method of the present invention includes a step (de-Al step) of selectively removing aluminum from the acidic solution containing aluminum together with cobalt and nickel to recover cobalt and nickel.

The de-Al step includes: a step of forming a hydroxide precipitate (hereinafter referred to as Al hydroxide) containing a part of cobalt and nickel together with aluminum [Al precipitation step], a step of leaching aluminum from the Al hydroxide [Al leaching step], and a step of separating and recovering the leached residue (Co, Ni hydroxide) from the aluminum leachate by solid-liquid separation [solid-liquid separating step].

When an alkali is added to the acidic solution to adjust the pH to 5 to 7, aluminum forms a hydroxide and precipitates. At the same time, in this pH range, a part of cobalt and nickel in the liquid also forms a hydroxide and co-precipitates with aluminum, and a hydroxide containing a part of cobalt and nickel together with aluminum (hereinafter referred to as Al hydroxide) is formed [Al precipitation step]. As the alkali added to the acidic solution, for example, sodium hydroxide having a concentration of less than 1 mol/L is used. If the pH of the solution is less than 5, the aluminum hydroxide is not sufficiently formed. If the pH of the solution exceeds 7, the solubility of aluminum increases and remains in the solution, which is not preferable. The acidic solution is adjusted to pH 5 to 7 to form the Al hydroxide. The Al hydroxide contains a part of cobalt and nickel co-precipitated. On the other hand, cobalt and nickel that do not precipitate are dissolved in the liquid.

The Al hydroxide is solid-liquid separated and recovered, mixed with an alkaline solution, and the mixed solution is adjusted to pH 8 or more, preferably pH 8 or more and pH 14 or less, more preferably pH 8 or more and pH 12.5 or less, and the aluminum hydroxide is leached out [Al leaching step]. For this alkaline solution, for example, a sodium hydroxide solution having a concentration of 4 to 6 mol/L is used so that the pH becomes 8 or more when the Al hydroxide is mixed. Aluminum forms a hydroxide under a liquid of pH 7 or less, but forms a complex $[Al(OH)_4(H_2O)_2]^-$—at a liquid of pH 8 or more. Thus, aluminum is reached out from the Al hydroxide by being mixed with sodium hydroxide having a pH of 8 or more. The liquid temperature at which aluminum is leached is preferably 50° C. to 80° C. If the liquid temperature is less than 50° C., the aluminum leaching effect is reduced.

On the other hand, since the cobalt and nickel contained in the Al hydroxide described above remain as hydroxide under liquid conditions of pH 8 or more, the leachate residue (Co, Ni hydroxide) is recovered by solid-liquid separation; and the Co, Ni hydroxide contained in the leachate residue and the aluminum contained in the filtration are separated [separation and recovery step].

In the above-described de-Al step, aluminum can be separated from the cobalt and nickel, and the cobalt and nickel co-precipitated with Al hydroxide can be recovered to avoid loss of the cobalt and nickel.

By returning the recovered leachate residue (Co, Ni hydroxide) to the sulfuric acid leachate (acidic solution) at the beginning of the process (at least before adding an alkaline, more specifically before removing copper), a sulfuric acid leachate that has cobalt and nickel concentrations higher than the sulfuric acid leachate before receiving the returned recovered leachate residue can be obtained. In addition, by using this sulfuric acid leachate, the recovery ratio of cobalt and nickel can be increased. In addition, since the above-described leachate residue (Co, Ni hydroxide) does not contain aluminum, the aluminum concentration in the sulfuric acid leachate (acidic solution) does not increase, even if the leachate residue (Co, Ni hydroxide) is returned to the sulfuric acid leachate (acidic solution) at the beginning of the process. Accordingly, the recovery process of cobalt and nickel can be proceeded without accumulating aluminum.

The "recovery ratio" in the present embodiment means the ratio of the content of cobalt and nickel contained in the leachate residue recovered after Al leaching to the content of cobalt and nickel contained in the positive electrode active material before sulfuric acid leaching.

EXAMPLE

Next, Examples of the present invention will be described in detail together with Comparative Examples.

Hereinafter, Examples of the present invention will be explained. The aluminum removal ratio was calculated by the following formula [1], and the elution ratio of cobalt or nickel was calculated by the following formula [2].

$$\text{Aluminum removal ratio} = A1/A2 \times 100 (\%) \qquad [1]$$

[In the above formula [1], A1 is the aluminum content in the leachate obtained in the aluminum leaching step, and A2 is the aluminum content in the precipitate obtained in the A1 (aluminum) precipitating step].

$$\text{Cobalt or nickel elution ratio} = C1/C2 \times 100 (\%) \qquad [2]$$

[In the above formula [2], C1 is the content of cobalt or nickel in the leachate obtained in the aluminum leaching step, and C2 is the content of cobalt or nickel in the precipitate obtained in the A1 starch formation step].

Example 1

14.5 g of the positive electrode active material taken out from the waste LIB was leached with 100 mL of sulfuric acid having a concentration of 2 mol/L, and a sodium hydroxide solution having a concentration of 25% was added so that the leached solution had a pH of 5.5. The precipitate was suction-filtered and solid-liquid separated, and the hydroxide precipitate was recovered (A1 precipitation step). The cobalt content of this hydroxide precipitate was 9.1 wt %, the nickel content was 12.7 wt %, and the aluminum content was 25.1 wt %. 20 g of this hydroxide precipitate was mixed with 200 mL of a sodium hydroxide solution having a concentration of 4 mol/L to prepare a sodium hydroxide mixture having a pH of 8 or more. This mixture was stirred at 80° C. for 2 hours to leach aluminum (aluminum leaching step). The sodium hydroxide mixture was suction-filtered again for solid-liquid separation, and the leachate residue was recovered (separation and recovery step). When the filtrate after the separation step was analyzed by ICP-AES, the aluminum concentration was 2.9 g/L, and cobalt and nickel were not detected. On the other hand, when the leaching residue after the separation step was composition-analyzed by XRF, the cobalt content was 30.7 wt %, the nickel content was 45.8 wt %, and the aluminum content was 3.5 wt %. According to this result, the removal ratio of aluminum contained in the leaching residue after the separation step was 68.9% (Sample No. A1). It was confirmed that cobalt and nickel contained in this leaching residue can be easily leached with sulfuric acid having a concentration of 2 mol/L.

The same treatment was carried out by changing the concentration and amount of the sodium hydroxide solution in the aluminum leaching step and the liquid temperature at the time of leaching. The results are shown in Table 1. As shown in Table 1, the concentration of the sodium hydroxide solution in the aluminum leaching step is preferably 4 to 6 mol/L, and the liquid temperature is preferably 50° C. to 80° C. (Sample Nos. A1 to A9). When the concentration of the sodium hydroxide solution is 2 mol/L or less or the liquid temperature is less than 50° C., the removal ratio of aluminum contained in the leaching residue after the separation step decreases (Sample Nos. A10 to A19).

TABLE 1

| | Aluminum leaching step | | | | De-Al residue | | De-Al leachate | |
| --- | --- | --- | --- | --- | --- | --- | --- | --- |
| Sample No. | NaOH liquid volume (ml) | NaOH concentration (mol/L) | Liquid temperature (° C.) | Leaching time (hr) | Residue amount (g) | Al removal ratio (%) | Co elution ratio (%) | Ni elution ration (%) |
| A1 | 200 | 4 | 80 | 2 | 20 | 68.9 | 0.0 | 0.0 |
| A2 | 200 | 6 | 80 | 2 | 20 | 95.3 | 0.0 | 0.0 |
| A3 | 300 | 4 | 80 | 2 | 20 | 72.2 | 0.0 | 0.0 |
| A4 | 1000 | 4 | 80 | 2 | 100 | 70.3 | 0.0 | 0.0 |
| A5 | 200 | 4 | 25 | 2 | 20 | 44.2 | 0.0 | 0.0 |
| A6 | 200 | 4 | 50 | 2 | 20 | 57.2 | 0.0 | 0.0 |
| A7 | 200 | 6 | 25 | 2 | 20 | 43.6 | 0.0 | 0.0 |
| A8 | 200 | 6 | 50 | 2 | 20 | 60.2 | 0.0 | 0.0 |
| A9 | 200 | 4 | 80 | 2 | 20 | 85.6 | 0.0 | 0.0 |
| A10 | 200 | 1 | 80 | 2 | 20 | 32.4 | 0.0 | 0.0 |
| A11 | 200 | 2 | 80 | 2 | 20 | 38.4 | 0.0 | 0.0 |
| A12 | 200 | 1 | 25 | 2 | 20 | 6.8 | 0.0 | 0.0 |
| A13 | 200 | 1 | 50 | 2 | 20 | 16.2 | 0.0 | 0.0 |
| A14 | 200 | 2 | 25 | 2 | 20 | 20.1 | 0.0 | 0.0 |
| A15 | 200 | 2 | 50 | 2 | 20 | 40.3 | 0.0 | 0.0 |
| A16 | 100 | 3 | 25 | 2 | 20 | 30.2 | 0.0 | 0.0 |
| A17 | 100 | 3 | 25 | 8 | 20 | 37.5 | 0.0 | 0.0 |
| A18 | 100 | 1 | 80 | 8 | 20 | 33.4 | 0.0 | 0.0 |
| A19 | 100 | 2 | 80 | 8 | 20 | 39.4 | 0.0 | 0.0 |

Note:
De-Al residue is the leachate residue after the separation step; and the de-Al leachate is the leachate after the separation step.

Comparative Example 1

Aluminum was leached in the same manner as in Example 1 except that sulfuric acid was used instead of the sodium hydroxide solution in the aluminum leaching step. The results are shown in Table 2 (Comparative Examples: Samples No. B1 and B2). As shown in Table 2, in sulfuric acid leaching, cobalt and nickel are significantly leached together with aluminum, so that aluminum cannot be selectively leached and separated.

TABLE 2

| Sample No. | Aluminum leaching step | | | | De-Al residue | | De-Al leachate | |
|---|---|---|---|---|---|---|---|---|
| | NaOH liquid volume (ml) | NaOH concentration (mol/L) | Liquid temperature (° C.) | Leaching time (hr) | Residue amount (g) | Al removal ratio (%) | Co elution ratio (%) | Ni elution ration (%) |
| B1 | 200 | 2 | 80 | 2 | 20 | 38.1 | 56.2 | 48.9 |
| B2 | 200 | 5 | 80 | 2 | 20 | 42.2 | 72.6 | 66.7 |

Example 2

The pulverized positive electrode active material taken out from the waste LIB was treated according to the processing step shown in FIG. 1.

Table 3 shows the contents of cobalt, nickel, manganese, lithium, aluminum and the like (hereinafter referred to as valuable metal contents) contained in the positive electrode active material. This pulverized positive electrode active material was leached out using sulfuric acid added with hydrogen peroxide [sulfuric acid leaching step]. Table 3 shows the valuable metal content of the sulfuric acid leachate (pH 0.2). Sodium hydrosulfide (NaHS aq) was added to this sulfuric acid leachate to make copper in the liquid a copper sulfide precipitate, and the copper sulfide precipitate was filtered to remove copper [de-Cu step]. Table 3 shows the valuable metal contents of the de-Cu filtrate and the filtration residue (Cu-containing residue). Sodium hydroxide (NaOH) is added to this de-Cu filtrate to adjust the pH to 3.5, and sodium hypochlorite (NaClO aq) is added to make manganese in the solution manganese oxide precipitate, and the manganese in the liquid was filtered to remove the manganese oxide precipitate to remove Mn and the filtrate was recovered [Mn removal step]. Table 3 shows the valuable metal contents of the de-Mn filtrate and the filtration residue (Mn-containing residue).

25% sodium hydroxide solution was added to the de-Mn filtrate so that the pH became 5.5, and the produced hydroxide precipitate was filtered and recovered [Al precipitation step]. 4 mol/L sodium hydroxide solution was mixed with this hydroxide precipitate to bring the pH to 8 or more, and the mixture was stirred at 80n° C. for 2 hours to leach aluminum. Then, it was filtered to recover the filtration residue (Co, Ni residue) and separated from the filtrate (Al leachate) [Al leachate step, separation recovery step]. Table 3 shows the valuable metal content of this filtration residue and the filtrate.

TABLE 3

| | Kind of Valuable Metal | | | | | | |
|---|---|---|---|---|---|---|---|
| | Co | Ni | Mn | Li | Al | Cu | |
| Sulfuric acid leaching step | | | | | | | |
| Positive electrode active material (wt %) | 12.0 | 10.5 | 9.8 | 5.2 | 3.9 | 3.1 | pH: 0.2 |
| Sulfuric acid leachate (g/L) | 13.4 | 12.2 | 10.5 | 6.2 | 3.2 | 2.3 | |
| De-Cu step | | | | | | | |
| De-Cu filtrate (g/L) | 10.2 | 9.3 | 8.3 | 4.4 | 2.4 | — | pH: 1.1 |
| Filtration residue (Cu containing residue) (wt %) | 0.3 | 0.2 | — | — | 3.1 | | |
| De-Mn step | | | | | | | |
| De-Mn filtrate (g/L) | 7.2 | 8.1 | — | 3.8 | 1.8 | — | pH: 2.7 |
| Filtration residue (Mn containing residue) (wt %) | 1.2 | 2.1 | 19.2 | — | — | — | |
| Al precipitation step | | | | | | | |
| Filtrate (g/L) | 5.9 | 6.2 | — | — | — | — | pH: 5.5 |
| Filtration residue (Co, Ni, Al containing residue) (wt %) | 6.7 | 9.7 | — | — | 8.6 | — | |
| Al leaching step, Separation and recovery step | | | | | | | |
| Filtrate (g/L) | — | — | — | — | 8.6 | — | pH: 8.0 |
| Filtration residue (Co, Ni containing residue) (wt %) | 15.5 | 15.1 | — | — | — | — | |

Example 3

In Example 2, after repeating the treatment of returning the filtration residue (Co, Ni residue) recovered in the separation and recovery step to the sulfuric acid leachate at the beginning of the treatment 10 times. Then, the concentration of the filtrate was adjusted by using the filtrate (Co, Ni containing filtrate) after solid-liquid separation of the aluminum hydroxide precipitated in the Al precipitation step. Then, cobalt and nickel were extracted and recovered by using a solvent (2-ethylhexyl phosphonic acid mono-2-ethylhexyl ester, Product name PC-88A in 20 vol %, kerosine in 80 vol %). The recovery ratio of cobalt was 93.3%, and the recovery ratio of nickel was 94.4%.

On the other hand, cobalt and nickel were recovered by solvent extraction in a similar way, except for not performing the process returning the filtrate residue (Co, Ni, residue) recovered in the separation and recovery step to the sulfuric acid leachate in the beginning of the process and using the filtrate (Co, Ni containing filtrate) obtained by solid-liquid separation of the aluminum hydroxide precipitated in the Al precipitation step instead. The recovery ratio of cobalt was 59.3%, the recovery ratio of nickel was 64.4%, and extent of the loss of cobalt and nickel was high.

What is claimed is:

1. A method of recovering cobalt and nickel, the method comprising the steps of:
    adding alkaline to an acidic solution containing aluminum together with cobalt and nickel, adjusting pH of the acidic solution to 5 to 7, and converting the cobalt, the nickel and the aluminum into hydroxides thereof;
    recovering the hydroxides by solid-liquid separation, mixing the recovered hydroxides with an alkaline solution, and leaching aluminum contained in the hydroxides under a liquid condition of pH 8 or more; and
    recovering a cobalt hydroxide and a nickel hydroxide that aluminum is separated therefrom by solid-separation on a leachate.

2. The method of recovering cobalt and nickel according to claim 1, wherein
the acidic solution containing aluminum together with cobalt and nickel is a sulfate solution having a concentration of 1.5 mol/L to 2 mol/L,
the alkaline is sodium hydroxide having a concentration of less than 1 mol/L, pH of the acidic solution being adjusted to pH 5 to 7 by adding the sodium hydroxide to the sulfate solution to produce the hydroxides,
the alkaline solution is a sodium hydroxide solution having a concentration of 4 mol/L to 6 mol/L, the aluminum contained in the hydroxides being leached out by mixing the sodium hydroxide solution to the recovered hydroxides recovered by solid-liquid separation under the liquid condition of pH 8 or more and a liquid temperature of 50° C. to 80° C., and
the cobalt hydroxide and the nickel hydroxide are recovered by the solid-liquid separation on the leachate.

3. The method of recovering cobalt and nickel according to claim 1, wherein concentrations of the cobalt and nickel in the acidic solution is increased by returning the cobalt hydroxide and the nickel hydroxide recovered after removing aluminum to the acidic solution at a beginning of a process.

4. The method of recovering cobalt and nickel according to claim 1, wherein the acidic solution containing aluminum together with cobalt and nickel is a sulfuric acid leached solution of crushed active material of a positive electrode taken out from a lithium-ion battery waste.

5. The method of recovering cobalt and nickel according to claim 2, wherein concentrations of the cobalt and nickel in the acidic solution is increased by returning the cobalt hydroxide and the nickel hydroxide recovered after removing aluminum to the acidic solution at a beginning of a process.

6. The method of recovering cobalt and nickel according to claim 2, wherein the acidic solution containing aluminum together with cobalt and nickel is a sulfuric acid leached solution of crushed active material of a positive electrode taken out from a lithium-ion battery waste.

7. The method of recovering cobalt and nickel according to claim 3, wherein the acidic solution containing aluminum together with cobalt and nickel is a sulfuric acid leached solution of crushed active material of a positive electrode taken out from a lithium-ion battery waste.

8. The method of recovering cobalt and nickel according to claim 5, wherein the acidic solution containing aluminum together with cobalt and nickel is a sulfuric acid leached solution of crushed active material of a positive electrode taken out from a lithium-ion battery waste.

* * * * *